United States Patent
Warnakulasooriya et al.

(10) Patent No.: US 7,293,135 B1
(45) Date of Patent: Nov. 6, 2007

(54) INVERTIBLE DISK DRIVE CONNECTION SCHEME

(75) Inventors: Bernard Warnakulasooriya, Franklin, MA (US); Steven D. Sardella, Marlborough, MA (US); Mickey Felton, Sterling, MA (US)

(73) Assignee: EMC Corporation, Hopkinton, MA (US)

( * ) Notice: Subject to any disclaimer, the term of this patent is extended or adjusted under 35 U.S.C. 154(b) by 341 days.

(21) Appl. No.: 11/027,505

(22) Filed: Dec. 30, 2004

(51) Int. Cl.
G06F 12/00 (2006.01)
(52) U.S. Cl. .................................... 711/112
(58) Field of Classification Search ............... 711/112; 710/316, 317
See application file for complete search history.

(56) References Cited

U.S. PATENT DOCUMENTS

| | | | |
|---|---|---|---|
| 5,017,146 A | 5/1991 | Uehara et al. ............... 436/65 |
| 5,181,679 A | 1/1993 | Frielinghaus et al. ... 246/182 R |
| 5,233,502 A | 8/1993 | Beatty et al. ............... 361/681 |
| 5,305,182 A | 4/1994 | Chen ......................... 361/684 |
| 5,398,158 A | 3/1995 | Fisher et al. ............... 361/685 |
| 5,488,541 A | 1/1996 | Mistry et al. ............... 361/788 |
| 5,579,204 A | 11/1996 | Nelson et al. ............. 361/685 |
| 5,602,717 A | 2/1997 | Leshem et al. ............ 361/685 |
| 5,668,696 A | 9/1997 | Schmitt ..................... 361/685 |
| 5,729,763 A | 3/1998 | Leshem ...................... 710/38 |
| 5,737,189 A | 4/1998 | Kammersgard et al. .... 361/726 |
| 5,737,193 A | 4/1998 | LaRiviere et al. ......... 361/799 |
| 5,768,551 A | 6/1998 | Bleiweiss et al. .......... 710/316 |
| 5,822,184 A | 10/1998 | Rabinovitz ................. 361/685 |
| 5,841,997 A | 11/1998 | Bleiweiss et al. ........... 710/317 |
| 5,887,270 A | 3/1999 | Brant et al. ................ 711/162 |
| 5,898,828 A | 4/1999 | Pignolet et al. ............... 714/6 |
| 5,984,634 A | 11/1999 | Teachout et al. ......... 415/213.1 |
| 6,009,535 A | 12/1999 | Halligan et al. .............. 714/5 |
| 6,061,966 A | 5/2000 | Nelson et al. ............... 49/394 |
| 6,078,503 A | 6/2000 | Gallagher et al. .......... 361/725 |
| 6,088,224 A | 7/2000 | Gallagher et al. .......... 361/695 |
| 6,169,249 B1 | 1/2001 | Teachout et al. ............ 174/559 |
| 6,199,839 B1 | 3/2001 | Rienzo ....................... 267/136 |
| 6,201,692 B1 | 3/2001 | Gamble et al. ............. 361/685 |
| 6,241,530 B1 | 6/2001 | Eddy et al. ................... 439/61 |
| 6,272,010 B1 | 8/2001 | Schmitt ..................... 361/685 |
| 6,292,360 B1 | 9/2001 | Carteau ..................... 361/685 |
| 6,317,334 B1 | 11/2001 | Abruzzini et al. .......... 361/797 |
| 6,454,585 B1 | 9/2002 | Homer et al. ............... 439/218 |
| 6,457,978 B1 | 10/2002 | Cloonan et al. .............. 439/61 |
| 6,628,513 B1 | 9/2003 | Gallagher et al. .......... 361/685 |
| 6,644,979 B2 | 11/2003 | Huang ......................... 439/65 |
| 6,924,986 B1 | 8/2005 | Sardella et al. ............. 361/785 |

Primary Examiner—Hiep T. Nguyen
(74) Attorney, Agent, or Firm—BainwoodHuang

(57) ABSTRACT

A module for a storage system is capable of accessing disk drives in a particular order regardless of its orientation. The module accesses the drives in the same order whether it is installed in a first orientation or in a second, inverted orientation. The module includes a plurality of disk controllers. Each disk controller is coupled to one or more disk drives. The disk controllers are mounted on the module so that when the module is coupled to the disk drives in a first orientation, the disk controllers are coupled to the disk drives in a particular order. When the module is coupled to the disk drives in a second orientation inverted relative to the first orientation, the disk controllers are coupled to the disk drives is the same particular order.

23 Claims, 8 Drawing Sheets

INVERTIBLE DISK DRIVE CONNECTION SCHEME

FIELD OF THE INVENTION

The present invention relates generally to the field of storage systems, and particularly to flexible interconnections of disk drives to control modules in a storage system.

BACKGROUND OF THE INVENTION

Today's networked computing environments are used in businesses for generating and storing large amounts of critical data. The storage systems used for moving, storing, and manipulating this critical data are expected to have high performance, high capacity, and high reliability, all in an ever smaller package. In order to provide a storage system with all the customer's requirements at the lowest cost possible, it is advantageous to maximize the number of interchangeable parts in the system. Manufacturing costs and parts sparing are thereby minimized.

Sometimes, the requirement to make certain modules in a system interchangeable causes design problems that must be solved. Whereas it may be straightforward to design a module to perform a function one way, it may be complicated to design the module to perform the same function two different ways. For example, it is difficult to design a module that accesses disk drives in multiple different orders.

SUMMARY OF THE INVENTION

In accordance with the principles of the invention, a module for a storage system is capable of accessing disk drives in a particular order regardless of its orientation. The module accesses the drives in the same order whether it is installed in a first orientation or in a second, inverted orientation.

The module according to the invention has a plurality of disk controllers mounted thereon. Each disk controller is coupled to one or more disk drives. The disk controllers are mounted on the module so that when the module is coupled to the disk drives in a first orientation, the disk controllers are coupled to the disk drives in a particular order. When the module is coupled to the disk drives in a second orientation inverted relative to the first orientation, the disk controllers are coupled to the disk drives is the same particular sequential order. Thus the disk controllers are capable of accessing the drives in the same order, regardless of the orientation of the module.

In accordance with one aspect of the invention, the disk controllers are mounted on the module such that, in the first orientation, signal lengths between each disk controller and the one or more disk drives to which it is coupled are relatively equivalent, and in the second orientation, the signal lengths between each disk controller and the one or more disk drives to which it is coupled are also relatively equivalent. This may be achieved by mounting the disk controllers in the middle of the module in a triangular arrangement. In a particular implementation, three disk controllers are mounted on the module. A first disk controller is mounted to the left of a second disk controller, and the third disk controller is mounted to the right of the second disk controller. The second disk controller is mounted farther from an edge of the module than the first and third disk controllers.

According to an alternate embodiment of the invention, the disk controllers are coupled to the one or more disk drives via a loop. Each disk controller accepts a configuration input indicating the orientation of the module. The disk controllers access the loop in a first direction when the module is in the first orientation, and access the loop in a second direction when the module is in the second orientation. In one implementation, the disk controllers are port bypass controllers, and the configuration input controls whether or not some ports of the port bypass controllers are bypassed. In another implementation, the disk controllers are crossbar switches, and the configuration input controls the connections between inputs and outputs on the crossbar switches.

The invention enables the provision of modules that can be flexibly oriented relative to a set of disk drives, thus allowing the modules to be interchangeable and thereby reducing manufacturing and stocking costs.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
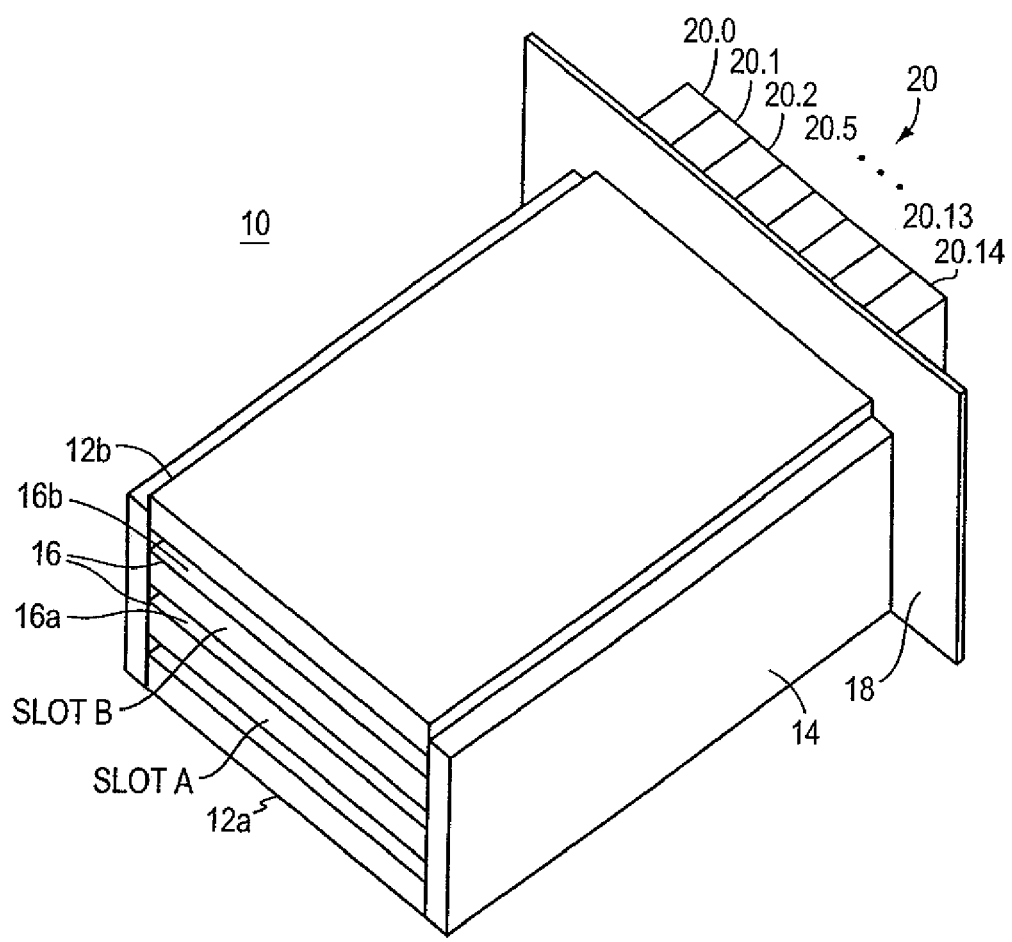
FIG. 1 is an isometric view of a storage system in which the invention may be implemented.

In accordance with the principles of the invention, a module for a storage system is capable of accessing disk drives in a particular order regardless of its orientation. The module accesses the drives in the same order whether it is installed in a first orientation or in a second, inverted orientation. Referring to FIG. 1, there is shown a portion of a storage system 10 that is one example of a system in which the principles of the invention may be employed. The storage system 10 shown may operate stand-alone or may populate a rack including other similar systems. The storage system 10 includes two power supplies 12a and 12b in the upper and lower positions of the enclosure 14. Between the power supplies are dual control modules 16. Control module 16a is mounted in a slot A. Control module 16b is mounted in a slot B, above the slot A. Control modules 16a and 16b are coupled to a midplane 18. Disk drives 20, here shown as 15 drives 20.0-20.14, are coupled to the other side of the midplane 18. The control modules move data to and from the disk drives 20.0-20.14 by accessing them via the midplane 18. The control modules 16a, 16b and the disk drives 20.0-20.14 are preferably interconnected via a channel loop, such as a Fibre Channel loop. Though a midplane is employed herein by example, other connection schemes can be implemented without departing from the invention. For example, the modules 16a and 16b could be coupled to the disk drives via cables such as ribbon cables. Furthermore, though 15 drives are shown, any number can be employed.

Figure 2:
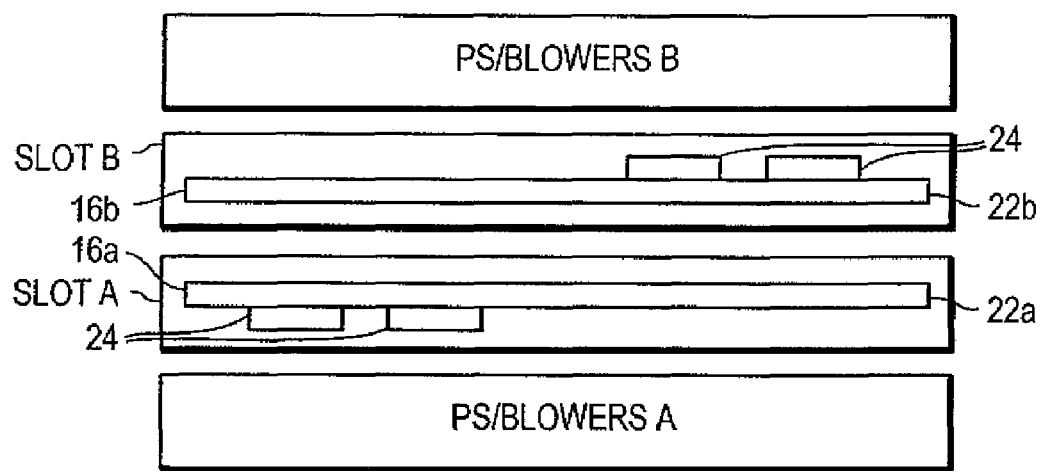
FIG. 2 is a front view of the control modules of FIG. 1, showing the inverted orientation of the modules.

The control modules 16a and 16b are preferably essentially identical to each other and thus interchangeable. However, as shown in FIG. 2, in order to optimize thermal dynamics, the control modules 16a and 16b are installed inverted relative to each other. As shown in FIG. 2, The component sides 22a and 22b of each control module respectively face the power supplies 12a and 12b so that airflow from blowers in the power supply units passes over the components 24 on each module 16a, 16b.

The disk drives 20 in the system are installed in fixed positions, while the control modules 16a, 16b are inverted relative to each other. This creates specific problems when attempting to provide a single interchangeable control module 16 that can be installed in either Slot A or Slot B and thus operate as the control module 16a or the control module 16b. This is because, when a given control module 16 operates as control module 16a, but then is inverted to operate as control module 16b, its connections to the disk drives 20 is now "backwards". That is, if for example a control module 16 is plugged in the bottom Slot A as shown in FIG. 1, one of its disk controller components may be coupled to disks 0-4. But, if the invention is not implemented, then when inverted and plugged in the top slot B, that same disk controller is now coupled to disks 10-14. If the module is to be operable in either Slot A or Slot B, then this is impermissible. Each disk controller must be coupled to the same physical disk drives no matter what the orientation of the module 16. Several alternative implementations of the invention address the problem.

In accordance with a preferred embodiment of the invention, the disk controllers are mounted on the control module 16 so that when the control module is coupled to the disk drives in a first orientation, for example in slot A, the disk controllers are coupled to the disk drives in a particular order. And when the module is coupled to the disk drives in a second orientation inverted relative to the first orientation, for example in slot B, the disk controllers are coupled to the disk drives in the same particular order. Furthermore, signal lengths between the disk controllers and their respective drives remain approximately the same regardless of the orientation of the module.

Figure 3:
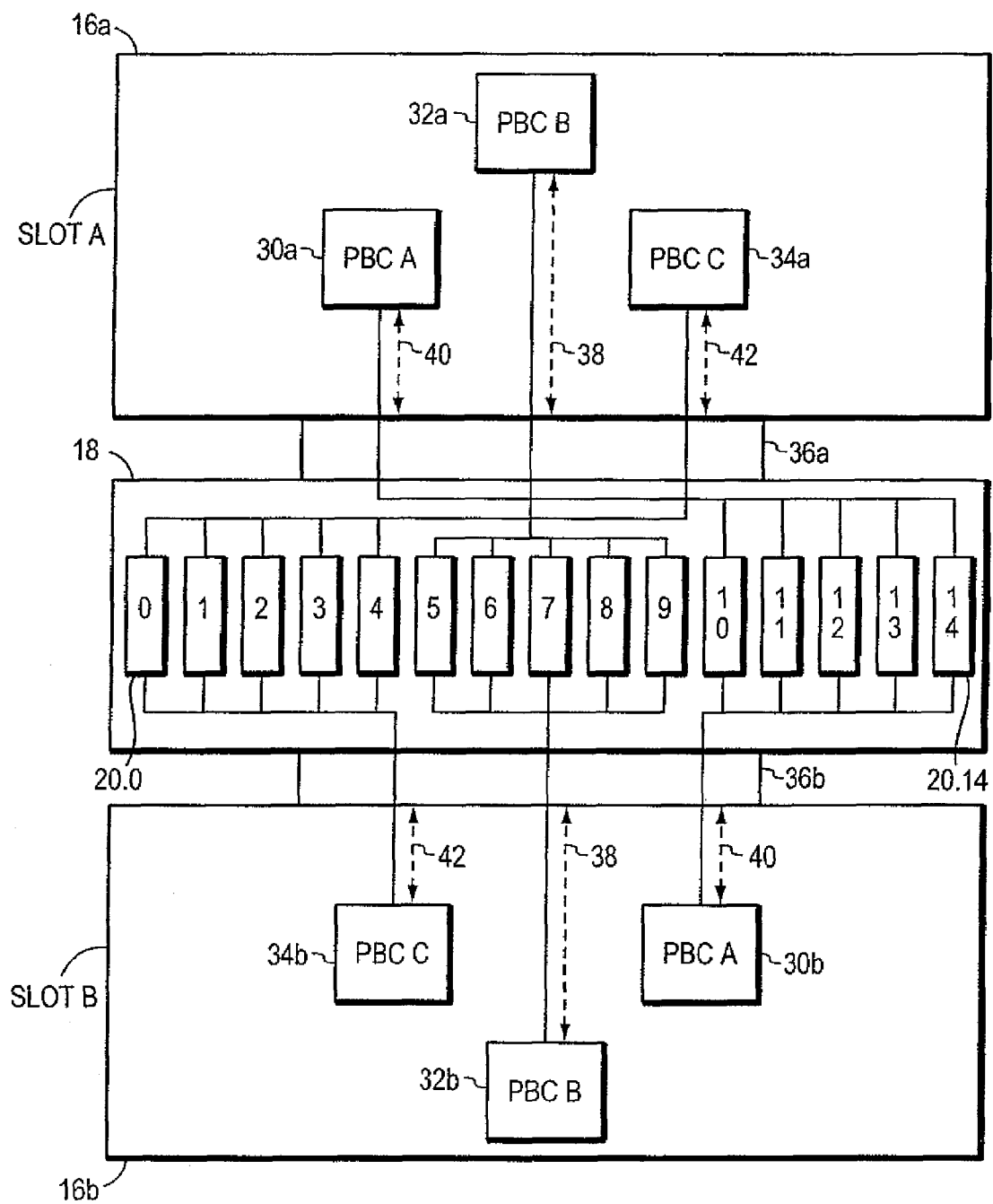
FIG. 3 is a schematic representation of an arrangement of disk controllers on interchangeable modules in accordance with the invention.

Referring to FIG. 3, each control module 16a and 16b is shown to include three disk controllers 30a,b, 32a,b and 34a,b, which may be for example port bypass controllers ("PBCs"). PBCs are provided by several manufacturers—for example, the Vitesse VSC7147, or the AMCC S2058, might be employed. Each control module 16a, 16b is coupled to the midplane 18 via a connector 36a, 36b. Disk drives 20.0-20.14 are also shown coupled to the midplane 18. Referring to the module 16a, it can be seen that the group of disk controllers 30a, 32a, and 34a are positioned centrally relative to the midplane 18. The disk controller 32a is positioned approximately in the middle of the control module 16a, at a distance 38 from the midplane 18. The disk controller 30a is positioned to the left of the disk controller 32a and at a distance 40 from the midplane 18, where the distance 40 is less than the distance 38. The disk controller 34a is positioned to the right of the disk controller 32a and at a distance 42 from the midplane 18, where the distance 42 is less than the distance 38 and preferably the same as the distance 40. The disk controller 30a controls drives 20.10-20.14. (Separate signal lines connect a given controller to each drive. For purposes of clarity, the signals are shown in a bus format.) The disk controller 32a controls drives 20.5-20.9. The disk controller 34a controls drives 20.0-20.4. Note that, on the module 16a positioned in slot A, the disk controllers 30a and 32a control the drives at the opposite ends of the midplane 18, as opposed to the drives closest to them on the midplane 18. Further, because the centrally positioned disk controller 32a is at the further distance 38 from the midplane 18, signal lengths from the disk controller 32a to drives 20.5-20.9 are the same or closely similar to signal lengths from the disk controller 30a to drives 20.10-20.14 and from the disk controller 34a to drives 20.0-20.4.

Now consider that the control module 16a is inverted and installed in slot B, now becoming control module 16b as shown. The connector 36b pins are now plugged into the midplane 18 in the opposite order that they were with respect to the control module 16a. The midplane routing for the connector 36b ensures that the same drives are connected to the same module connector pins as were used when the module was installed in slot A. Note that the disk controllers 30b, 32b, and 34b are still coupled to the disk drives 20.10-20.14, 20.5-20.9, and 20.0-20.4 respectively. Now the signal lengths from disk controller 30b are shorter than they were for disk controller 30a, but the signal lengths from disk controller 34b are also shorter, to the same degree as they were for disk controller 30b. The signal lengths for disk controller 32b to disks 20.5-20.9 are generally the same as they were for disk controller 32a. So, it can be seen that the signal lengths for the disk controllers are approximately equivalent relative to each other whether the control module is in position A or in inverted position B.

An important signal integrity advantage is provided by the arrangement of FIG. 3. If signal lengths were to change significantly when a control module 16a is inverted, as would occur without the central arrangement of the disk controllers in accordance with the invention, there is a risk that the control module's performance could be impaired or that errors could occur. The risk of failure or decreased performance is reduced by the central positioning of the disk controllers in accordance with the invention.

In accordance with a second embodiment of the invention, disk controllers are coupled to the disk drives via a loop, such as a Fibre Channel loop. Each disk controller accepts a configuration input indicating the orientation of the module. The disk controllers access the loop in a first direction when the module is in a first orientation, and access the loop in a second direction when the module is in a second, inverted orientation.

Figure 4:
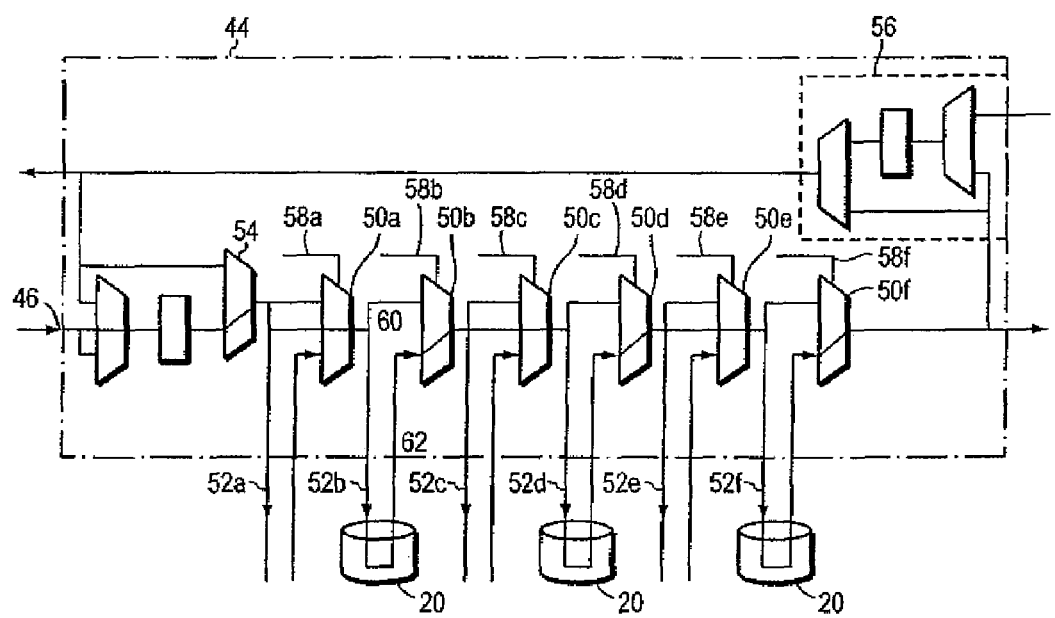
FIG. 4 is a schematic representation of the functionality of a disk controller implemented as a port bypass controller.

Referring to FIG. 4, there is shown an example of a disk controller 44, herein shown as a port bypass controller (PBC). Available PBCs such as those previously mentioned have certain functionality in common. The PBC is essentially a series of switches or multiplexers that selectably add devices to the Fibre Channel loop or bypass the device port. The PBC is shown to include an input port 46, and six switches 50a-50f. The inputs to each switch 50a-50f are coupled to ports 52a-52f, which may or may not be coupled to disk drives 20. Other standard PBC components are input bypass switch 54 and feedback switches 56.

Each switch 50a-50f has a corresponding configuration input 58a-58f. The configuration inputs 58a-f are coupled to logic that actively places ports 52a-f in and out of the loop. If for example the configuration input 58b is de-asserted, i.e. not coupled to ground, the upper input 60 is passed through the switch 50b to the switch 50c, and the port 52b is bypassed. If on the other hand the configuration input 58b is asserted, i.e. coupled to ground, the lower input 62 at switch 50b, from the disk drive 20, is passed through the switch 50b to the switch 50c.

Figure 5:
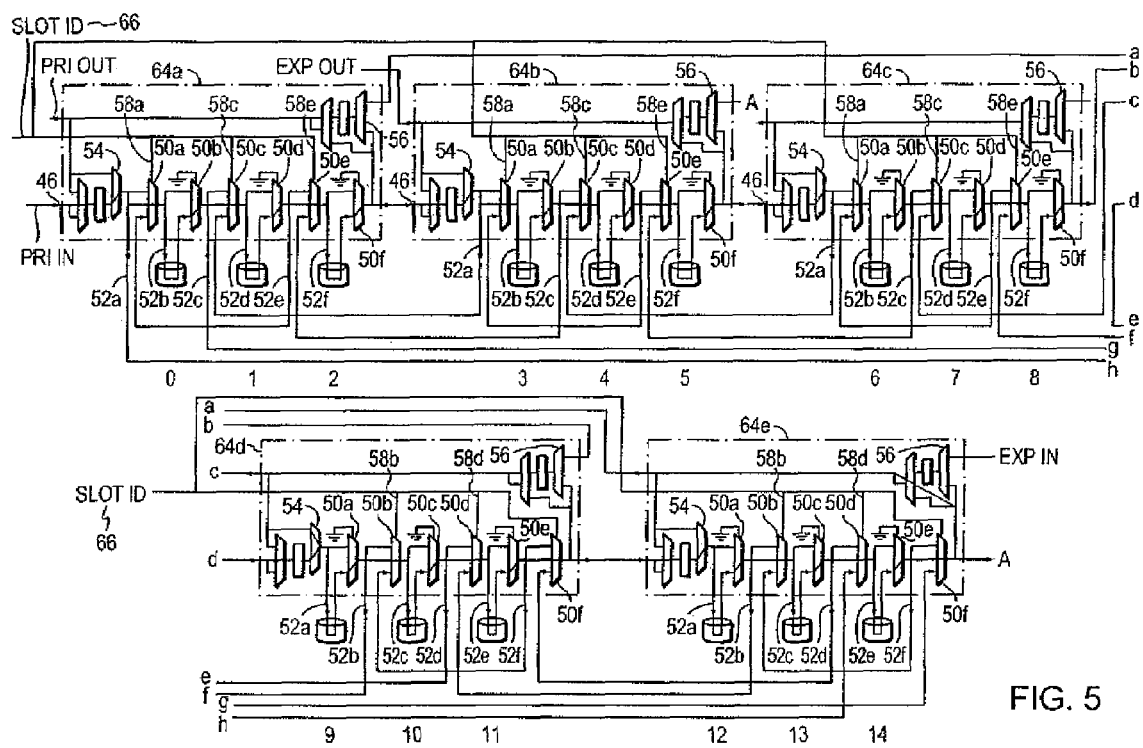
FIG. 5 is a schematic representation of the configuration of a set of disk controllers coupled to disk drives in accordance with the invention when the module on which they reside is arranged in a first orientation.

Now referring to FIG. 5, there is shown a set of disk controllers 64a, 64b, 64c, 64d, 64e as configured for a module 16a when plugged into slot B. Each disk controller 64a-64e is coupled to three disk drives 20. When the module 16a is installed in slot B, Ports 52b, 52d, and 52f of PBC 64a are coupled to disk drives 20.0, 20.1, and 20.2 respectively. Ports 52b, 52d, and 52f of PBC 64b are coupled to disk drives 20.3, 20.4, and 20.5. Ports 52b, 52d, and 52f of PBC 64c are coupled to disk drives 20.6, 20.7, and 20.8. Ports 52a, 52c, and 52e of PBC 64d are coupled to disk drives 20.9, 20.10, and 20.11. Ports 52a, 52c, and 52e of PBC 64e are coupled to disk drives 20.12, 20.13, and 20.14. A slot ID bit 66 is coupled to the configuration inputs 58a, 58c, and 58e to the switches 50a, 50c, and 50e of PBCs 64a, 64b, and 64c, and is coupled to the configuration inputs 58b, 58d, 58f to the switches 50b, 50d, and 50f of PBCs 64e and 64f. The slot ID bit 66 indicates whether the module is installed in slot B or in inverted slot A. The state of the slot ID bit 66 determines the direction in which the data loop flows through the set of PBCs 64a-64e, and thus determines the order in which the disk drives 20.0-20.14 are accessed.

The slot ID bit 66 may be a simple pull-up or pull-down resistor that drives the Slot ID signal when the module is installed in Slot A or Slot B. For example, a particular pin on connector 36a (FIG. 3) may be coupled to a pull-up resistor on the midplane 18, while that same pin on connector 36b is coupled to a pull-down resistor on the midplane 18. A Slot ID signal on a module 16 coupled to this connector pin will present an asserted or deasserted polarity depending on whether the module 16 is installed in Slot A or Slot B.

When the slot ID bit 66 is de-asserted, i.e. not coupled to ground, indicating the module is installed in slot B, the enable inputs 58a, 58c, and 58e for each PBC 64a-64c are de-asserted, bypassing ports 52a, 52c, and 52e. The enable inputs 58b, 58d, and 58f for each PBC 64d-64e are de-asserted, bypassing ports 52b, 52d, and 52f. In this configuration, the loop passes through the PBCs from left to right in FIG. 5. For PBC 64a, data from input port 46 is passed through switch 50a, and disk drive 20.0 is accessed via port 52b. The loop then passes from disk drive 20.0 through switch 50b, bypassing port 52c. Disk drive 20.1 is then accessed via port 52d. Port 52e is bypassed, and disk drive 20.2 is accessed via port 52f. Disk drives 20.3-20.8 are accessed in the same manner via PBCs 64b and 64c. The output of switch 50f of PBC 64c is coupled to the feedback switch 56 of PBC 64d and then to disk drive 20.9 on port 52a of PBC 64d. Port 52b of PBC 64d is bypassed. Disk drive 20.10 is accessed on port 52c of PBC 64d, port 52d is bypassed, and disk drive 20.11 is accessed on port 52e of PBC 64d. Port 52f of PBC 64d is bypassed to the input port of PBC 64e. Disk drives 20.12-20.14 are accessed in the same manner as described for PBC 64d. Thus, in this configuration where the Slot ID bit is asserted, the disk drives are accessed in order from disk drive 20.0 to disk drive 20.14.

Figure 6:
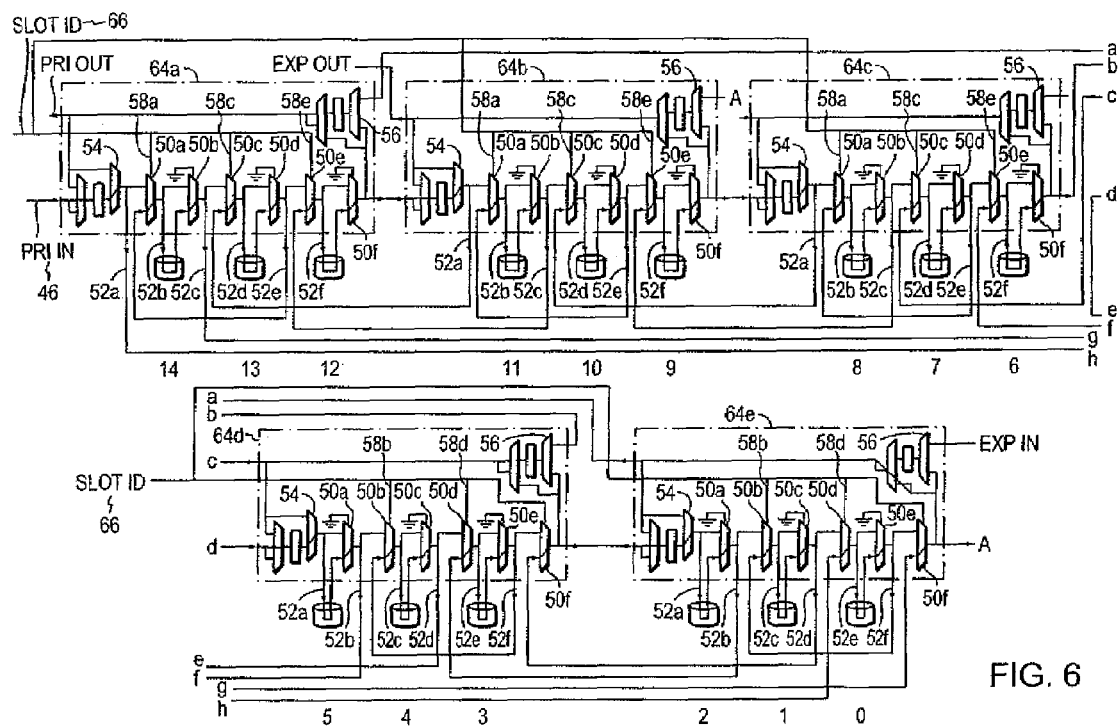
FIG. 6 is a schematic representation of the configuration of the set of disk controllers coupled to disk drives in accordance with the invention when the module on which they reside is arranged in a second orientation.

Referring to FIG. 6, when the slot ID bit 66 is asserted, i.e. coupled to ground, indicating that the module is installed in slot A and thus inverted, the disk drives 20.0-20.14 are now connected to the PBCs 64a-64e in the opposite order. That is, when the module 16 is installed in slot A, ports 52b, 52d, and 52f of PBC 64a are coupled to disk drives 20.14, 20.13, and 20.12 respectively. Ports 52b, 52d, and 52f of PBC 64b are coupled to disk drives 20.11, 20.10, and 20.9. Ports 52b, 52d, and 52f of PBC 64c are coupled to disk drives 20.8, 20.7, and 20.6. Ports 52a, 52c, and 52e of PBC 64d are coupled to disk drives 20.5, 20.4, and 20.3. Ports 52a, 52c, and 52e of PBC 64e are coupled to disk drives 20,2, 20.1, and 20.0. Since the slot ID bit 66 is asserted, all configuration inputs 58a-58f on each PBC 64a-64e are coupled to ground. In this case all ports 52a-52f for each PBC 64a-64e are enabled, and the loop passes through the PBCs from right to left.

The input 46 for PBC 64a now exits port 52a, which is coupled to port 52d of PBC 64e. The switch 50d of PBC 64e couples the loop to the disk drive 20.0 on port 52e of PBC 64e. The loop then exits port 52f of PBC 64e, where it is coupled to port 52b of PBC 64e. Disk drive 20.1 is then accessed, and the loop is passed through port 52f of PBC 64d to the input port 46 of PBC 64e. From there the loop passes to the disk drive 20.2 on port 52a of PBC 52e. The loop then exits port 52b of PBC 64e, to port 52d of PBC 64d. Disk drive 20.3 is accessed via port 52e of PBC 64d, and the loop then exits port 52f to port 52b of PBC 64d. Disk drive 20.4 is accessed on port 52c of PBC 64d. The loop then passes to the input port of PBC 64d. Disk drive 20.5 is accessed, and the loop passes out port 52b of PBC 64d to port 52e of PBC 64c. Disk drive 20.6 is accessed on port 52f of PBC 64c and the output of switch 50f is coupled through feedback switches 56 of PBC 64d back to port 52c of PBC 64c. The disk drive 20.7 is then accessed on port 52d of PBC 64c, and the loop passes out port 52e of PBC 64c to port 52a of PBC 64c. Disk drive 20.8 is then accessed on port 52b of PBC 64c. The loop then exits port 52c of PBC 64c and enters port 52e of PBC 64b. Disk drive 20.9 is then accessed on port 52f of PBC 64b, and the output of switch 50f of PBC 64b is coupled to the input 46 of PBC 64c. Port 52a of PBC 64c is coupled to port 52c of PBC 64b. Disk drive 20.10 is accessed on port 64d of PBC 64b. The loop then exits port 64e of PBC 64b to port 52a of PBC 64b. Disk drive 20.11 is then accessed on port 52b of PBC 64b. The loop exits port 52c of PBC 64b and enters port 52e of PBC 64a. Disk drive 20.12 is accessed on port 52f of PBC 64a. The loop exits the switch 50f of PBC 64a to the input 46 of PBC 64b. Port 52a of PBC 64b is coupled back to port 52c of PBC 64a. Disk drive 20.13 is accessed on port 52d of PBC 64a. The loop then exits port 52e of PBC 64a and enters port 52a of PBC 64a. Disk drive 20,14 is accessed on port 52b of PBC 64a. The loop then exits port 52c of PBC 64a, and enters port 52f of PBC 64e to complete the loop. Thus disk drives 0-14 are again accessed in order, even though they are physically in opposite locations when the module is installed in slot A.

In accordance with a third embodiment of the invention, reconfigurable crosspoint switches are provided on the control module 16 to control the order in which the disk drives 20.0-20.14 are accessed. The configuration of the crosspoint switches is chosen depending on the orientation of the control module.

Figure 7:
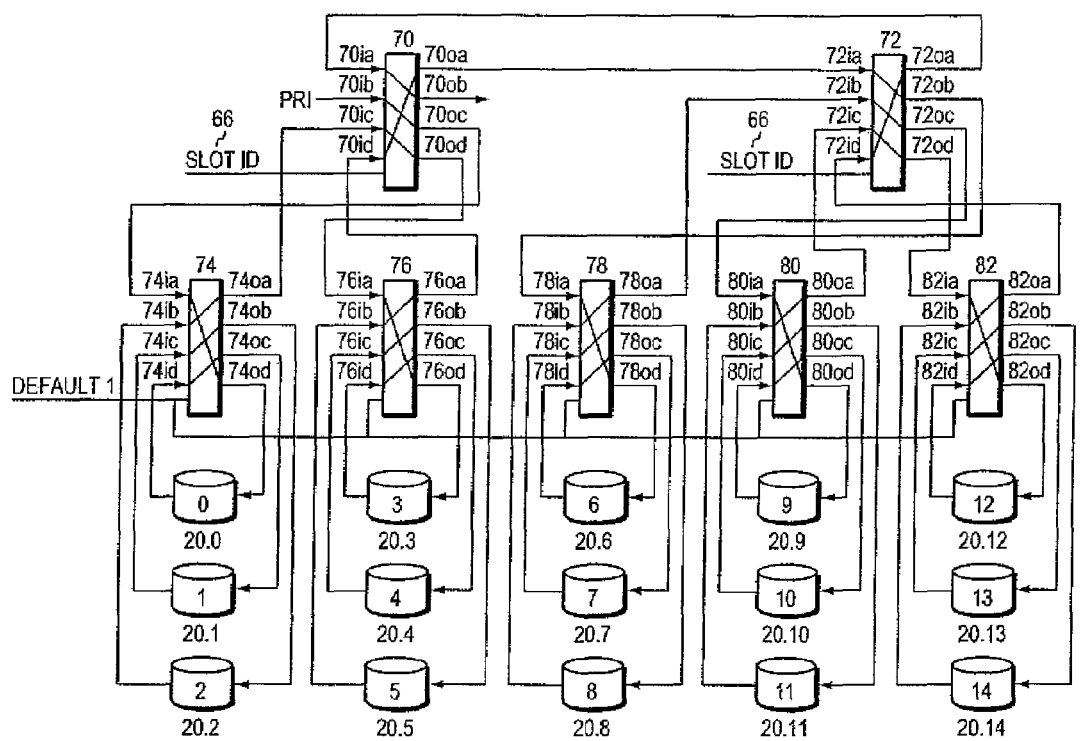
FIG. 7 is a schematic representation of the configuration of a set of switches coupled to disk drives in accordance with the invention when the module on which they reside is arranged in a first orientation.
Figure 8:
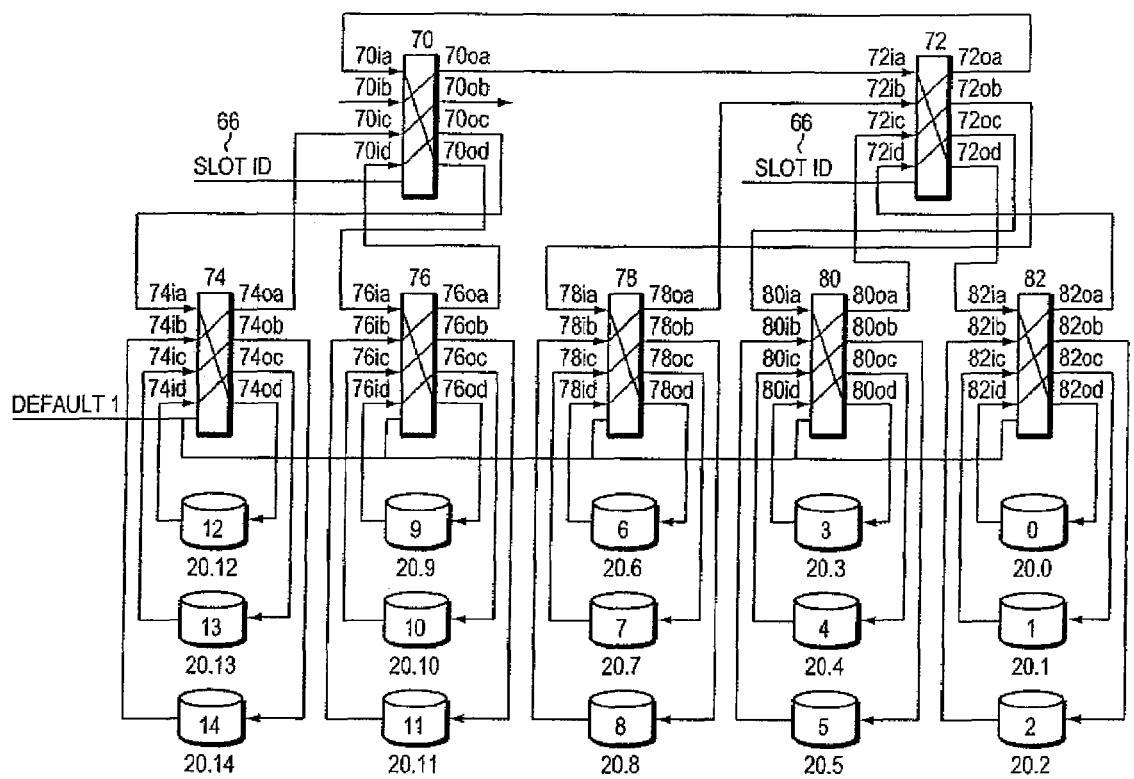
FIG. 8 is a schematic representation of the configuration of the switches of FIG. 7 coupled to disk drives in accordance with the invention when the module on which they reside is arranged in a second orientation.

Referring to FIGS. 7 and 8, there are shown crosspoint switches 70, 72, 74, 76, 78, 80 and 82. The crosspoint switches may be implemented for example as Vitesse VSC3104×4 crosspoint switches, or Vitesse VSC3108×8 crosspoint switches, or a combination thereof. Here, ×4 switches are shown. In these switches, a configuration input controls the connections between inputs and outputs.

When the module 16 is installed in slot B, as shown in FIG. 7, crosspoint switch 74 is coupled to disk drives 20.0, 20.1, and 20.2. Crosspoint switch 76 is coupled to disk drives 20.3, 20.4, and 20.5. Crosspoint switch 78 is coupled to disk drives 20.6, 20.7, and 20.8. Crosspoint switch 80 is coupled to disk drives 20.9, 20.10, and 20.11. Crosspoint switch 82 is coupled to disk drives 20.12, 20.13, and 20.14. Crosspoint switch 70 is coupled to crosspoint switches 74 and 76 and to crosspoint switch 72. Crosspoint switch 72 is coupled to crosspoint switch 70 and to crosspoint switches 78, 80, and 82.

When module 16 is installed in slot A, as shown in FIG. 8, crosspoint switch 74 is coupled to disk drives 20.14, 20.13, and 20.12. Crosspoint switch 76 is coupled to disk drives 20.11, 20.10, and 20.9. Crosspoint switch 78 is coupled to disk drives 20.8, 20.7, and 20.6. Crosspoint switch 80 is coupled to disk drives 20.5, 20.4, and 20.3. Crosspoint switch 82 is coupled to disk drives 20.2, 20.1, and 20.0. Crosspoint switch 70 is coupled to crosspoint switches 74 and 76 and to crosspoint switch 72. Crosspoint switch 72 is coupled to crosspoint switch 70 and to crosspoint switches 78, 80, and 82.

For switches 74, 76, 78, 80, and 82, the configuration input is set to "default 1". This may be a hard driven set of inputs or may be a preset software code that sets a register within the switch. Each switch's inputs and outputs are denoted 74ia-d and 74oa-d, 76ia-d and 76oa-d, etc. For the configuration input "default 1", the switch 74's input 74ia is coupled to output 74od, input 74ib is coupled to output 74oa, input 74ic is coupled to output 74ob, and input 74id is coupled to output 74oc. The inputs and outputs of the switches 76, 78, 80, 82 are coupled together in the same order as for switch 74. The configuration input for the switch 72 is set to "default 2". In this case the switch 72's input 72ia is coupled to output 72ob, input 72ib is coupled to output 72oc, input 72ic is coupled to output 72od, and input 72id is coupled to output 72oa.

In each case, the order in which the disk drives are accessed is from 20.0-20.14 and is controlled by the configuration of the crosspoint switches 70 and 72. The loop input "PRI" is coupled to input 70.ib of the switch 70, and the output of the loop is coupled to the output 70ob of the switch 70. The configuration input for the switches 70 and 72 is controlled by the slot ID bit.

When the module 16 is plugged into slot B as shown in FIG. 7, the slot ID bit is deasserted. In this configuration, the switch input 70ia is coupled to the output 70ob—the exit for the loop. The loop input PRI is coupled to the switch input 70ib, which is coupled to the output 70oc. The input 70ic is coupled to the output 70od. The input 70id is coupled to the output 70oa.

For the switch 72, the deasserted Slot ID configuration input couples the switch 72's input 72ia to output 72ob. Input 72ib is coupled to output 72oc, input 72ic is coupled to output 72od, and input 72id is coupled to output 72oa.

Thus, when the module 16 is plugged into slot B, the input of the loop is coupled to the output 70oc of the switch 70, which is then coupled to the input 74ia of switch 74. In accordance with the configuration of switch 74 as previously described, disk drives 20.0, 20.1, and 20.2 are thus accessed in order as shown. The output 74oa of switch 72 is coupled back to the input 70ic of switch 70. The input 70ic is coupled to the output 70id, which is then coupled to the input 76ia of switch 76. Again, in accordance with the configuration of switch 76 as previously described, disk drives 20.3, 20.4, and 20.5 are thus accessed in order. The output 74od of switch 74 is coupled back to the input 70d of switch 70, which is coupled to the output 70oa. The output 70oa is coupled to the input 72ia of switch 72. The output 72ob of switch 72 is coupled to the input 78ia of switch 78. As previously described, disk drives 20.6, 20.7, and 20.8 are accessed in order. The output 78oa of switch 78 is coupled back to the input 72ib of the switch 72. The loop passes from the input 72ib to the output 72oc and then to the input 80ia of the switch 80. Here disk drives 20.9, 20.10, and 20.11 are accessed in order. The output 80oa of switch 80 is coupled back to the input 72ic of switch 72, which is coupled to the output 72od. The output 72d is coupled to the input 82ia of switch 82. In accordance with the configuration of switch 82, disk drives 20.12, 20.13, and 20.14 are thus accessed in order. The output 82oa of switch 82 is coupled back to the input 72id of switch 72, which is coupled to the output 72oa and on to the input 70ia of switch 70, thus completing the loop.

When the module 16 is plugged into slot A as shown in FIG. 8, the slot ID bit is asserted. In this configuration, the switch input 70ia is coupled to the output 70od. The loop input is coupled to the switch input 70ib, which is coupled to the output 70oa. The input 70ic is coupled to the output 70od—the exit for the loop. The input 70id is coupled to the output 70oc.

For the switch 72, the asserted Slot ID configuration input couples the switch 72's input 72ia to output 72od. Input 72ib is coupled to output 72oa, input 72ic is coupled to output 72ob, and input 72id is coupled to output 72oc.

When the module 16 is plugged into slot A, the input of the loop is coupled to the output 70oa of the switch 70, which is then coupled to the input 72ia of switch 72. As previously described, the input 72ia is coupled to the output 72od. The output 72od is coupled to the input 82ia of switch 82. In accordance with the configuration of switch 82 as previously described, disk drives 20.0, 20.1, and 20.2 are thus accessed in order. The output 82oa of switch 82 is coupled back to the input 72id of switch 72. The input 72id is coupled to the output 72oc, which is then coupled to the input 80ia of switch 80. Again, in accordance with the configuration of switch 80 as previously described, disk drives 20.3, 20.4, and 20.5 are thus accessed in order. The output 80ia of switch 80 is coupled back to the input 72ic of switch 72, which is coupled to the output 72ob. The output 72ob is coupled to the input 78ia of switch 78. Disk drives 20.6, 20.7, and 20.8 are thus accessed in order. The output 78oa of switch 78 is coupled back to the input 72ib of the switch 72. The input 72ib is coupled to the output 72oa, which is coupled to the input 70ia of switch 70. The input 70ia is coupled to the output 70od. The output 70od is coupled to the input 76ia of switch 76. As previously described, disk drives 20.9, 20.10, and 20.11 are accessed in order. The output 76oa of switch 76 is coupled back to the input 70id of switch 70, which is coupled to the output 70oc. The output 70oc is coupled to the input 74ia of switch 74. In accordance with the configuration of switch 74, disk drives 20.12, 20.13, and 20.14 are thus accessed in order. The output 74oa of switch 74 is coupled back to the input 70ic of switch 70, thus completing the loop.

In accordance with the implementation shown in FIG. 8, the signal routing that connects the switches 74, 76, 78, 80, and 82 to the respective disk drives 20 on the midplane 18 is different for each slot A and B. (A similar situation was shown for the embodiment of FIG. 3.) For example, for the module 16 plugged into slot B as shown in FIG. 7, the disk drive 20.0 is connected to ports 74id, 74od by the signal routing on the midplane 18 coupled to the slot B. But for the inverted module 16 plugged into slot A as shown in FIG. 8, drive 20.14 is now where drive 20.0 was, but drive 20.14 is coupled to ports 74*ib*, 74*ob* by the signal routing on the midplane 18 coupled to the slot A. When done this way, the switches 74, 76, 78, 80, and 82 are configured the same regardless of the orientation of the module 16. However, it is clear that in a different embodiment the switches could be re-configured when the module is inverted so that midplane 18 signal routing would be the same for both slots A and B. For example, in FIG. 8, the stack of drives 12, 13, 14 would be coupled to the switch 74 in the opposite order, such that 20.14 would be coupled to the ports 74*id*, 74*od* and 20.12 would be coupled to 74*ib*,74*ob*. In this case the switch would be configured so that the drives 20.12, 20.13, 20.14 would be accessed from the bottom drive 20.12 to the top drive 20.14. The same is true for the other switches 76, 78, 80, and 82. In this embodiment, the configuration input for switches 74, 76, 78, 80, and 82 would be Slot_ID 66 rather than default 1. It is thus seen that the flexibly configurable switches provide several design alternatives—some which involve specific midplane signal routing for each slot, and some that re-configure the switches based on the slot into which the module is installed.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. Apparatus for a storage system comprising:
    a module having a plurality of disk controllers mounted thereon, each disk controller for coupling to one or more disk drives;
    the disk controllers being mounted on the module so that when the module is coupled to the disk drives in a first orientation, the disk controllers are coupled to the disk drives in a particular order;
    and wherein when the module is coupled to the disk drives in a second orientation inverted relative to the first orientation, the disk controllers are coupled to the disk drives is the same particular order.

2. The apparatus of claim 1 wherein the disk controllers are mounted on the module such that, in the first orientation, signal lengths between each disk controller and the one or more disk drives to which it is coupled are relatively equivalent, and in the second orientation, the signal lengths between each disk controller and the one or more disk drives to which it is coupled are also relatively equivalent.

3. The apparatus of claim 2 wherein the disk controllers are mounted on the module in the middle of the module in a triangular arrangement.

4. The apparatus of claim 3 wherein three disk controllers are mounted on the module, a first disk controller mounted to the left of a second disk controller, and the third disk controller mounted to the right of the second disk controller, the second disk controller being mounted farther from an edge of the module than the first and third disk controllers.

5. The Apparatus of claim 1 wherein the disk controllers are for coupling to the one or more disk drives via a loop; and wherein each disk controller accepts a configuration input indicating the orientation of the module;
    the disk controllers accessing the loop in a first direction when the module is in the first orientation;
    the disk controllers accessing the loop in a second direction when the module is in the second orientation.

6. The apparatus of claim 5 wherein the disk controllers are port bypass controllers, and wherein the configuration input controls whether or not some ports of the port bypass controllers are bypassed.

7. The apparatus of claim 5 wherein the disk controllers are crossbar switches, and wherein the configuration input controls the connections between inputs and outputs on the crossbar switches.

8. A storage system comprising:
    a plurality of disk drives coupled to a midplane;
    a first module coupled to the midplane, the first module having a first plurality of disk controllers mounted thereon, each of the first plurality of disk controllers for coupling to one or more of the disk drives;
    a second module coupled to the midplane, the second module having a second plurality of disk controllers mounted thereon, each of the second plurality of disk controllers for coupling to one or more of the disk drives, the second module being interchangeable with the first module;
    the first module being coupled to the midplane in a first orientation, wherein the first plurality of disk controllers are coupled to the disk drives in a particular order;
    the second module being coupled to the midplane in a second orientation inverted relative to the first orientation, wherein the second plurality of disk controllers are coupled to the disk drives in the same particular order.

9. The storage system of claim 8 wherein the first and second plurality of disk controllers are mounted on the first and second modules respectively such that, in the first orientation, signal lengths between each disk controller and the one or more disk drives to which it is coupled are relatively equivalent, and in the second orientation, the signal lengths between each disk controller and the one or more disk drives to which it is coupled are also relatively equivalent.

10. The storage system of claim 9 wherein the first plurality of disk controllers are mounted on the first module in the middle of the first module in a triangular arrangement, and wherein the second plurality of disk controllers are mounted on the second module in the middle of the second module in the triangular arrangement.

11. The storage system of claim 10 wherein the first plurality of disk controllers comprises three disk controllers mounted on the first module, a first disk controller mounted to the left of a second disk controller, and the third disk controller mounted to the right of the second disk controller, the second disk controller being mounted farther from an edge of the first module than the first and third disk controllers; and
    wherein the second plurality of disk controllers comprises three disk controllers mounted on the second module, a first disk controller mounted to the left of a second disk controller, and the third disk controller mounted to the right of the second disk controller, the second disk controller being mounted farther from an edge of the first module than the first and third disk controllers.

12. A method for a storage system comprising the steps of:
    providing a module having a plurality of disk controllers mounted thereon, each disk controller for coupling to one or more disk drives; the disk controllers being mounted on the module so that when the module is coupled to the disk drives in a first orientation, the disk controllers are coupled to the disk drives in a particular order, and when the module is coupled to the disk drives in a second orientation inverted relative to the first orientation, the disk controllers are coupled to the disk drives is the same particular order; and coupling the module to the disk drives in one of the first orientation and the second orientation to couple the disk drives in the particular order.

13. The method of claim 12 wherein the disk controllers are mounted on the module such that, in the first orientation, signal lengths between each disk controller and the one or more disk drives to which it is coupled are relatively equivalent, and in the second orientation, the signal lengths between each disk controller and the one or more disk drives to which it is coupled are also relatively equivalent.

14. The method of claim 13 wherein the disk controllers are mounted on the module in the middle of the module in a triangular arrangement.

15. The method of claim 14 wherein three disk controllers are mounted on the module, a first disk controller mounted to the left of a second disk controller, and the third disk controller mounted to the right of the second disk controller, the second disk controller being mounted farther from an edge of the module than the first and third disk controllers.

16. The method of claim 12 wherein the disk controllers are for coupling to the one or disk drives via a loop;

and wherein each disk controller accepts a configuration input indicating the orientation of the module;

the disk controllers accessing the loop in a first direction when the module is in the first orientation;

the disk controllers accessing the loop in a second direction when the module is in the second orientation.

17. The method of claim 16 wherein the disk controllers are port bypass controllers, and wherein the configuration input controls whether or not some ports of the port bypass controllers are bypassed.

18. The method of claim 16 wherein the disk controllers are crossbar switches, and wherein the configuration input controls the connections between inputs and outputs on the crossbar switches.

19. A method for a storage system comprising the steps of:
coupling a plurality of disk drives to a midplane;
coupling a first module to the midplane, the first module having a first plurality of disk controllers mounted thereon, each of the first plurality of disk controllers for coupling to one or more of the disk drives, the first module coupling to the midplane in a first orientation, wherein the first plurality of disk controllers are coupled to the first plurality of disk drives in a particular order;

coupling a second module to the midplane, the second module having a second plurality of disk controllers mounted thereon, each of the second plurality of disk controllers for coupling to one or more of the disk drives, the second module being interchangeable with the first module, the second module coupling to the midplane in a second orientation inverted relative to the first orientation, wherein the second plurality of disk controllers are coupled to the disk drives in the same particular order.

20. The method of 19 wherein the first and second plurality of disk controllers are mounted on the first and second modules respectively such that, in the first orientation, signal lengths between each disk controller and the one or more disk drives to which it is coupled are relatively equivalent, and in the second orientation, the signal lengths between each disk controller and the one or more disk drives to which it is coupled are also relatively equivalent.

21. The method of claim 20 wherein the first plurality of disk controllers are mounted on the first module in the middle of the first module in a triangular arrangement, and wherein the second plurality of disk controllers are mounted on the second module in the middle of the second module in the triangular arrangement.

22. The method of claim 21 wherein the first plurality of disk controllers comprises three disk controllers mounted on the first module, a first disk controller mounted to the left of a second disk controller, and the third disk controller mounted to the right of the second disk controller, the second disk controller being mounted farther from an edge of the first module than the first and third disk controllers, and wherein the second plurality of disk controllers comprises three disk controllers mounted on the second module, a first disk controller mounted to the left of a second disk controller, and the third disk controller mounted to the right of the second disk controller, the second disk controller being mounted farther from an edge of the first module than the first and third disk controllers.

23. The method of claim 12 wherein coupling the module to the disk drives includes:
connecting the module to a midplane; and
connecting the disk drives to the midplane to establish a set of communication pathways between the module and the disk drives.

* * * * *